May 14, 1968  J. W. ELLMORE  3,383,577
REVERSIBLE MOTOR CONTROL CIRCUITS
Filed May 27, 1965  3 Sheets-Sheet 1

INVENTOR.
John W. Ellmore
BY
Synnestvedt & Lechner
ATTORNEYS

May 14, 1968     J. W. ELLMORE     3,383,577

REVERSIBLE MOTOR CONTROL CIRCUITS

Filed May 27, 1965     3 Sheets-Sheet 2

INVENTOR.
John W. Ellmore
BY
Synnestvedt & Lechner
ATTORNEYS

United States Patent Office 3,383,577
Patented May 14, 1968

3,383,577
REVERSIBLE MOTOR CONTROL CIRCUITS
John W. Ellmore, West Chester, Pa., assignor to Allister Manufacturing Company, Inc., Exton, Pa., a corporation of Pennsylvania
Filed May 27, 1965, Ser. No. 459,354
9 Claims. (Cl. 318—266)

ABSTRACT OF THE DISCLOSURE

Control circuits provide against running a motor beyond limit switches arranged at two limits of travel. An auxiliary centrifugal switch is connected in series with motor controlling relays in such manner that improper operation of push buttons, e.g., simultaneous operation of push buttons at two control stations, cannot result in a limit switch being bypassed.

---

This invention relates to improvements in electric motor control circuitry and more particularly to circuitry for controlling the movements of a motor driven apparatus between first and second limits of travel.

More specifically, the invention is used for the control of single phase induction motors, which, as is known in the art, are equipped with starting and running windings and are typically provided with a centrifugal switch in the start winding circuit to disconnect the start winding when the motor reaches a predetermined speed.

Motors equipped with the circuits of the present invention are especially suited for opening and closing overhead doors of the type widely used in garages, warehouses, factories and similar installations.

Due to their simplicity and low cost, single phase induction motors are often used for this purpose, but there are certain features inherent in their design which create problems when they are used to drive a door or other mechanism between two limits of travel.

One of the more troublesome problems arises from the fact that with prior practical and economically feasible circuit designs, the door operators can be run past their limits of travel. In control circuits provided with separate up and down switches, if both are depressed during an operating cycle or if one control button is depressed at the wrong time in an operating cycle, the limit switch towards which the operator is moving will not stop the motor. This situation frequently occurs when the door is remotely controlled by radio or by push buttons which are located both inside and outside of the building equipped with the door. When so equipped, a person outside of a building may depress the down button not knowing that another person has pressed the up button. If such a condition persists, the motor main winding will remain energized even though the limit of travel is reached. Even in the case of single button control circuits, when the push button is held depressed during the instant between the opening of a limit switch and the time the motor slows down to the speed at which its start winding is reconnected, the motor main winding will remain energized. In all of these circuits, driving the operator past its limit switch will result in much inconvenience and may cause damage to the door, the motor or the operating mechanism.

With the foregoing in view, the primary object of the invention is the provision of a control circuit which prevents the operation of an electric motor driven reversible operator beyond either of its limits of travel.

A more specific object of the invention is the provision of simple and effective circuitry for preventing the bypassing of a limit switch associated with a limit of travel, by improper operation of the motor control circuit.

A still more specific object of the invention is the provision of circuitry for preventing the operation of the motor driven operator beyond limits of travel without resort to complex electromechanical or mechanical mechanisms.

Another object of the invention is the provision of means for accomplishing the foregoing objects in a simple, economical and extremely reliable manner.

These and other objects of this invention are achieved by means of circuitry which includes a centrifugal switch for controlling the operating switch means. The centrifugal switch is opened at or slightly below the speed at which the start winding is disconnected from the motor operating circuit and stays open so long as that speed is maintained. In all embodiments, the centrifugal switch is connected to the operating switch means so that the operating switches cannot be manipulated to drive the motor beyond its limit switches. In one embodiment of the invention, the centrifugal switch prevents reconnection of the motor main winding when a limit of travel has been reached and the start winding has not been reconnected to the motor operating circuit. In other embodiments of the invention, the centrifugal switch deactivates the operating switch means whenever the starting winding is disconnected from the motor operating circuit.

More specifically, the manner of achieving the objects of the invention will become fully apparent from the following detailed description of the illustrative embodiments of the invention and from the accompanying drawings in which.

Figure 1:
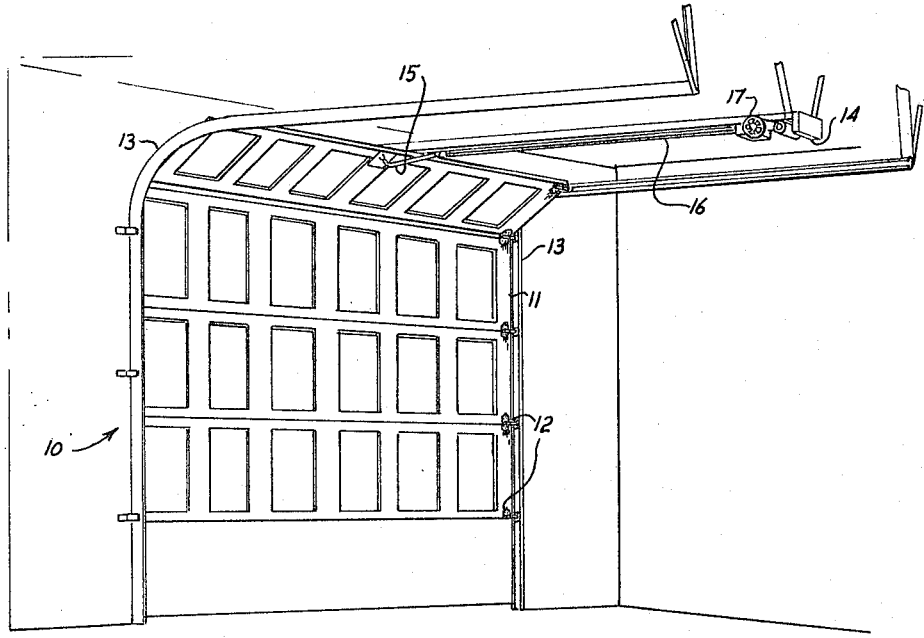
FIGURE 1 is a perspective view of a door equipped with a typical form of operator controlled by the circuitry of the present invention.

Referring in detail to the drawings, FIGURE 1 shows a typical overhead door 10. The door 10 is conventionally formed of a plurality of hinged sections 11, to which are secured laterally extending rollers 12. The rollers ride in channel shaped guide tracks 13 secured to the walls of the building on opposite sides of the doorway. The guide tracks are provided with curved sections and their upper portions generally extend parallel to the ceiling, to provide space for storage of the door when it is in the raised position.

The door is opened and closed by means of a single phase induction motor 14 which drives a conventional operator, for example, of the draw bar type. The draw bar 15 rides in a track 16 and is interconnected to the motor by means of a chain (not shown) which is wound up on a pulley mounted at the end of the guide track 16. Limit switches, not shown in FIGURE 1, are positioned to be opened by portions of the drive train whenever either of the limits of travel of the door is reached.

Figure 2:
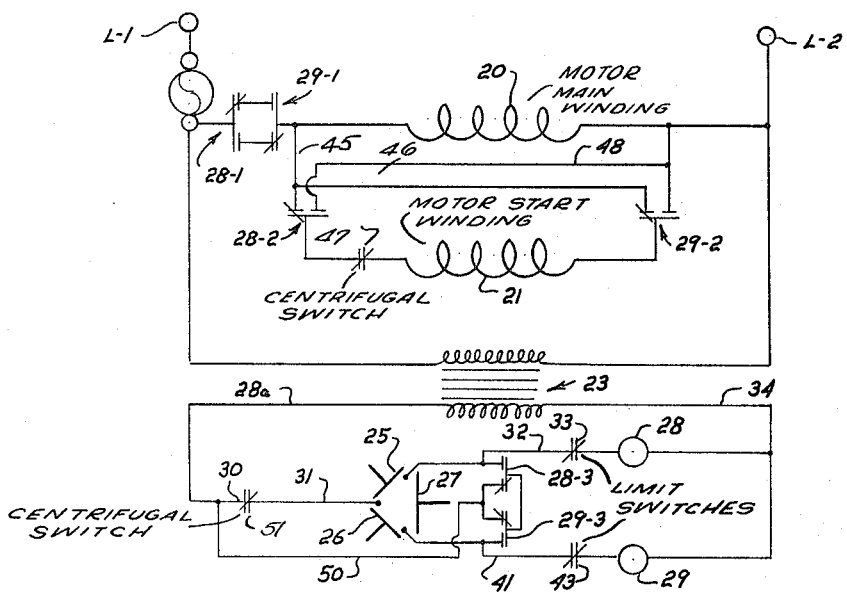
FIGURE 2 is a schematic view of a preferred form of the invention.

In the embodiment of the invention shown in FIGURE 2, the motor is schematically represented by main windings 20 and starting windings 21. The windings are shown connected to lines L1 and L2 which are in turn connected to a suitable AC power source. A transformer 23 is also connected to the power source in order to provide a relatively low voltage, for instance 24 volts, for energizing the control circuit about to be described.

In FIGURE 2, the control circuit is provided with relay operating switch means including a pair of operating switches or push buttons 25 and 26 for raising and lowering the door. A stop switch or push button 27 stops the door at positions intermediate its limits of travel. Although the switches 25 through 27 are readily adaptable for remote control operation, for instance, by a suitable radio control unit, for simplicity they are shown schematically in the drawings as manually operable push button switches of known type.

In the embodiment of FIGURE 2, the push buttons 25 and 26 complete circuits from the transformer 23 to the relays 28 and 29 respectively. Relay 28 is connected to a first terminal of the transformer by means of a first-lead 28–a, line 30, line 31, push button 25, line 32, a normally closed limit switch 33, and a second lead 34 which leads to the second terminal of the transformer 23. Relay 28 is a three-pole double-throw relay, the sets of relay contacts being designated as 28–1, 28–2 and 28–3, respectively.

Push button 26 connects the transformer to the relay 29 by means of the line 28–a, line 30, line 31, the switch 26, a line 41, a normally closed limit switch 43 and the line 34. Relay 29 is also a three-pole double-throw relay, the associated pairs of the relay contacts being designated 29–1, 29–2 and 29–3.

The door 10 is opened by depression of the push button 25, which energizes the relay 28. Upon energization, the normally open relay contacts close, while the normally closed relay contacts open. Thus, a circuit is completed to the motor main winding 20 and the motor start winding 21 through the normally open 28–1 contacts, the normally closed 29–1 contacts, a line 45, a line 46 through the normally closed 29–2 contacts, the start winding 21, the normally open 28–2 contacts, a centrifugal start switch 47, and a line 48 to L2. At the same time the holding circuit for the relay is completed through the normally open 28–3 contacts, the normally closed 29–3 contacts, a line 50, and the line 28–a.

The relay thus remains energized after the push button 25 is released. When the motor exceeds the pre-determined operating speed, the centrifugally operated switch contacts 47 open, isolating the starting winding from the motor operating circuit.

Operation of the switch 26 closes the door by reversing the connection of the start winding 21 to the lines L1 and L2. This operation is accomplished as follows:

Closure of operating switch 26 connects relay 29 to the transformer via line 28–a, line 30, 31 and 41. Relay 29 is energized and closes the normally open 29–3 contacts, thereby locking itself in, so that operating switch 26 can be released. The relay also closes the normally open 29–1 contacts completing a circuit to the motor main windings and closes the normally open 29–2 contacts, to interconnect the start winding in the reverse sense.

In carrying out the invention, an auxiliary centrifugally operated switch 51 is connected in series with the operating switches 25 and 26. This switch opens at the same or a slightly lower speed than the switch 47, and disables both of the operating switches whenever the motor operating speed is exceeded.

This arrangement forms a very important part of my invention, since it prevents completion of an alternate circuit path from the power supply to the motor main winding 20 if the operating switch for the opposite direction of travel is depressed while the motor is rotating in one direction. Without this switch, depression of switch 26 while relay 28 is energized would energize the relay 29. Although relay 28 would drop out after the 29–3 contacts were operated, relay 29 would be locked in and would of course not be de-energized since the limit switch 43 would not open. The motor would drive the operator beyond the limit switch, and might cause damage to the mechanism or burn itself out if the condition went unnoticed. The provision of the auxiliary switch 51 eliminates this possibility.

The door may be stopped at any time by operation of push button 27. Push button 27 does this by energizing the un-energized one of relays 28 and 29 as follows. If button 25 is initially depressed so that relay 28 is energized the door rises. A circuit is then complete through line 34, relay 29, switch 43, line 41, switch 27, the closed 28–3 contacts, the closed 29–3 contacts, lines 50 and 28–a to the other side of transformer 23. When the relay 29 energizes by depression of the stop button, the lower 29–1 contact opens, breaking the circuit to the motor, and the normally closed 29–3 contacts open, break the holding circuit for the relay 28 so that it de-energizes. This allows the closed 28–3 contacts to open, so that the relay 29 will also be de-energized, even if stop button 27 is held depressed.

Figure 3:
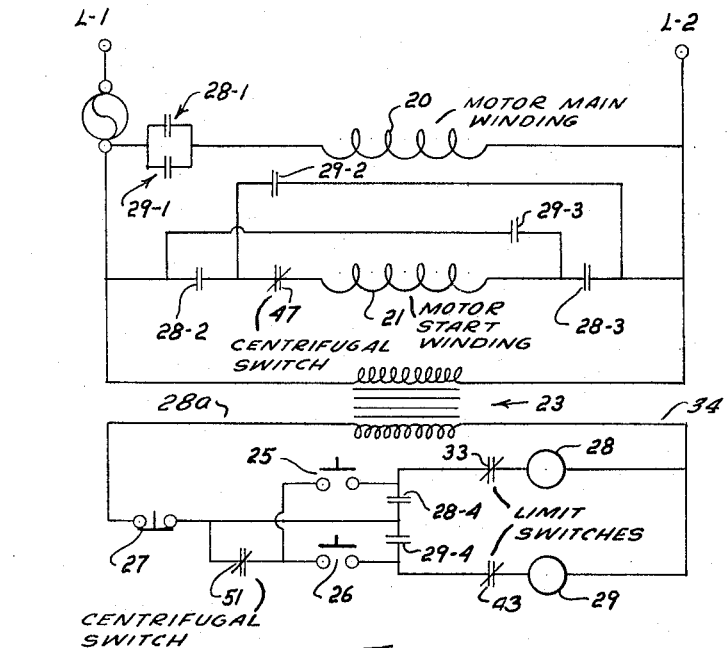
FIGURE 3 is a schematic view of another preferred form of the invention.

In describing the embodiment disclosed in FIGURE 3, the same numerals used above are used to denote like parts. Motor windings 20 and 21 are again shown connected to the lines L1 and L2 in conventional manner. In this embodiment operating switches 25 and 26 control up and down movement of the operator, respectively, while the stop switch 27 breaks the circuit to either of the relays 28 or 29 at positions intermediate the limits of travel.

Relay 28 is provided with four sets of normally open contacts 28–1, 28–2, 28–3 and 28–4, the relay being energized by depression of the push button operating switch 25. Each of these sets of contacts close when the relay is energized. The 28–1 contacts complete a circuit to motor main winding 20 and the 28–2 and 28–3 contacts complete a circuit to the start winding 21. The 28–4 contacts lock in the relay 28, since they complete a bypass circuit around the push button 25.

In like manner, the relay 29 is provided with four sets of normally opened contacts designated 29–1, 29–2, 29–3 and 29–4, in the drawings. When the relay 29 is energized the 29–1 contacts close to energize the motor main winding, the 29–2 and 29–3 contacts close to reverse the circuit connections of the starting winding to the lines L1 and L2, and the 29–4 contacts close to lock in the relay 29.

As in the embodiment of FIGURE 2, up and down limit switches 33 and 43 are normally closed and are connected in series with the relays 28 and 29 respectively. The relay is de-energized when its associated limit switch is opened unless the stop switch 27 is opened first.

In the embodiment of FIGURE 3, the auxiliary centrifugal switch 51 is connected in series with the push buttons 25 and 26, and again prevents energization of a relay by its push button whenever the motor is at or above the speed at which the centrifugal switch 47 is opened.

In the control circuit of FIGURE 3, were it not for the provision of the auxiliary centrifugal switch 51, momentary depression of one push button after another had been depressed would result in a situation in which the relay for controlling movement towards the opposite direction of travel would be energized. Thus, even though one limit of travel was reached the other limit switch would remain closed, and the relay associated with it would continue to provide a circuit path to the motor main winding. The provision of the auxiliary centrifugal switch 51 in this embodiment provides a simple method of preventing such an occurrence.

Figure 4:
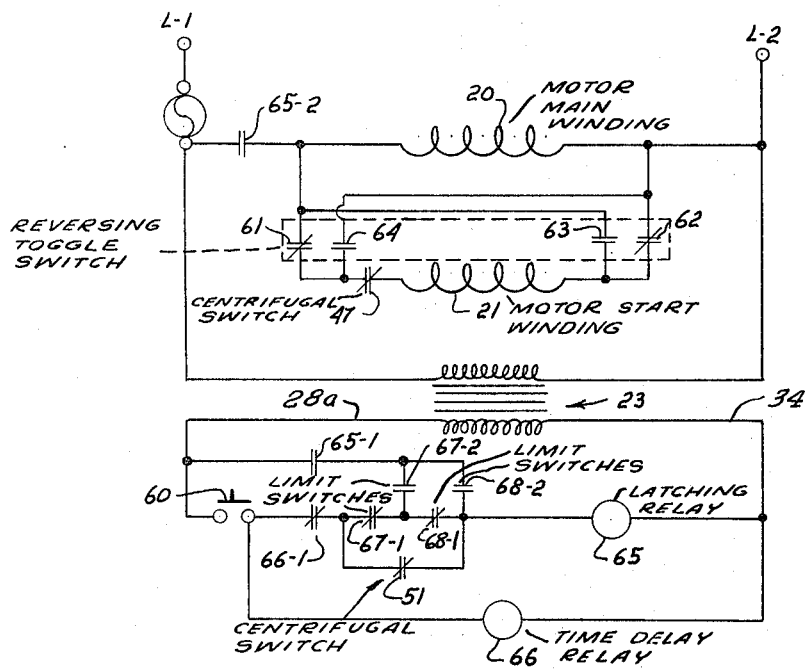
FIGURE 4 is a schematic view of a third preferred form of the invention.

In the embodiment of FIGURE 4, raising, lowering and stopping the door are controlled by single button 60. In this embodiment running winding 20 and starting winding 21 are connected to the lines L1 and L2 in conventional fashion. The starting winding is provided with a reversing circuit which includes a reversing toggle switch having contacts 61, 62, 63 and 64. When contacts 61 and 62 are opened, contacts 63 and 64 are closed and when 61 and 62 close, contacts 63 and 64 are opened. This switch is of conventional construction and is provided with mechanism which reverses the connections of the start windings to the lines L1 and L2 after the centrifugally operated start winding switch 47 has opened. Movement in both directions and stopping is controlled by single operating switch 60 which energizes a relay 65 through normally closed contacts 66–1 (controlled by a relay 66) and contacts 67–1 and 68–1 of limit switches each being placed adjacent a limit of travel.

The limit switches are also provided with contacts 67–2 and 68–2. Limit switch contacts 67–1 and 68–1 are closed whenever the operator is at positions intermediate its limits of travel, whereas contacts 67–2 and 68–2 are opened at such intermediate positions and are closed when the limits of travel are reached. Thus, when the motor is stopped at an intermediate position, depression of switch 60 causes energization of the relay 65 through closed contacts 66–1, 67–1 and 68–1. When a limit of travel is reached, the relay can be energized by the push button through a circuit path including switch 51 which shunts the limit switch contacts 67–1 and 68–1.

Relay 66 is also controlled by the push button 60. Relay 66 is of the slow to operate type and shortly after the relay 65 is energized, it opens the switch contact 66–1, so that the relay 65 is de-energized.

A switch 65–1, controlled by the relay 65, is connected in series with the 67–2 and 68–2 limit switch contacts. Switch 65–1 is latched and unlatched on consecutive operations of the relay 65 by means of relay latching structure shown in FIGURE 5 and described hereinafter. The relay 65 also controls a switch 65–2, in the motor operating circuit, which is also latched and unlatched along with switch 65–1.

Figure 5:
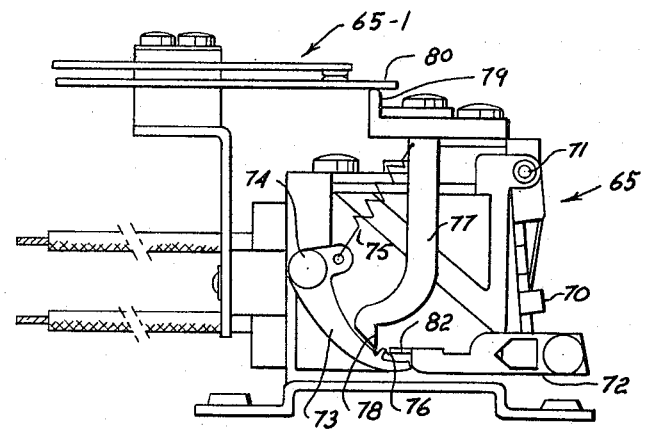
FIGURE 5 is a side elevational view of the form of relay used in the embodiment of FIGURE 4.

As shown in FIGURE 5, relay 65 is provided with an armature 70, pivotally mounted on a pin 71. A latching arm 72 is connected to the lower end of the armature for movement in a substantially horizontal plane when the relay is energized. A pivotally mounted rocker arm 73 is mounted on a pin 74 and is urged to the position shown in FIGURE 6 by means of a spring 75. The arm 73 is provided with latching finger 76. A downwardly extending switch actuating arm 77 is urged by the spring 75 in a counterclockwise direction. When the parts are in the position shown, the lower end 78 of the arm 77 rests on the finger 76. In this position, a projection 79 mounted on an upper extension of the arm, bears against the lowermost switch contact 80 of each of the switches 65–1 and 65–2, only one such switch 65–1 being shown in FIGURE 5. Actuation of the relay pivots the armature 70 in a clock-wise direction about the pivot pin 71, moving the actuating arm 72 to the left as viewed in FIGURE 5. A lip 82 on the actuating arm 72 engages the finger 76, moving it away from the lower edge 78 of the arm 77. Spring 75 urges the arm 77 in a counterclockwise direction over the lip 76. As the arm 72 withdraws upon de-energization of the relay, the switch contacts 65–1 open. On the next actuation the relay arm 77 is rocked in a clockwise direction and spring 75 moves rocker arm 73 in the counter clockwise direction. Upon withdrawal of the actuating arm 72 the lip 76 again moves in front of the lowermost edge of the arm 77 causing the switch contacts to be latched in the closed position. It may thus be seen that actuations of the relay 65 cause the switch contacts to alternately be held in the open or closed position.

To start the motor when the operator is at positions intermediate each of its limits of travel, the relay 65 is energized through contacts 66–1, 67–1 and 68–1 when operating switch 60 is initially depressed. When the relay is energized the contacts 65–1 and 65–2 are closed and are latched in the closed position. Shortly after the relay 65 closes its contacts, the relay 66 opens its normally closed switch contacts 66–1 and the relay 65 is de-energized. The motor is thus interconnected to the lines L1 and L2 and such interconnection is maintained until the push button operated switch 60 is again depressed or until a limit of travel is reached.

When the motor is operating and one of the limit switches, for instance the limit switch having contacts 67–1 and 67–2 is encountered, the 67–1 contacts will be opened, and the 67–2 contacts will be closed, completing a circuit from the transformer, through the previously latched 65–1 contacts, through the 67–2 contacts, the closed 68–1 contacts and the relay 65. The relay 65 immediately energizes, unlatching the 65–1 and the 65–2 contacts, which disconnects the motor from the power supply and de-energizes the relay.

Re-energization of the relay 65 by the push button operated switch 60, in the brief interval between the time that a limit switch is encountered and the time that the motor slows to the speed at which the centrifugal switch 47 closes, is prevented by the auxiliary centrifugal switch 51, in the line bypassing the limit switch contacts 67–1 and 68–1. As in the other embodiments the auxiliary centrifugal switch opens and remains opened whenever the motor is operating at or above running speed and only closes when the start winding is reconnected. Thus, it is impossible to energize the relay 65 by the push button until the start windings are re-connected to the motor circuit. At that time, the toggle switch contacts 61 through 64 will have reversed the connection of the start winding so that the motor will not drive the operator beyond the limits of travel.

Figure 6:
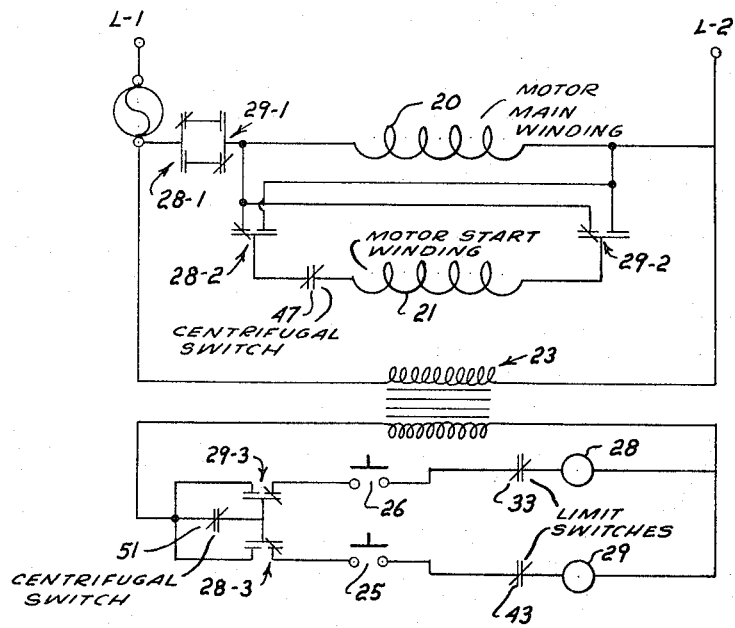
FIGURE 6 is a view of still another preferred embodiment of the invention.

FIGURE 6 discloses an alternative embodiment of the invention more closely related to the embodiments shown in FIGURES 2 and 3, except that release of either button opens the circuit to its related relay and stops the motor. In FIGURE 6, the motor windings are connected to the lines L1 and L2 in substantially the same manner as in the embodiment of FIGURE 2, and the same numerals are again used to denote similar parts. The relay 28, energizes the circuit to open the door 10 and, is provided with an additional set of contacts labeled 28–3. These contacts are in the operating circuit for the relay 29 and relay 29 is provided with contacts 29–3 in the circuit for the relay 28. The centrifugal switch 51 again opens at the same time as, or shortly before the opening of the switch 47. With this arrangement, closing of one of the operating switches breaks the circuit for the other relay. For example switch 26, opens a normally closed set of contacts in the circuit to the relay 29, thus eliminating the possibility of energizing the relay 29 when the operator is between limit switches. As in the case with the other embodiments, the centrifugal switch 51 prevents energization of a relay by a push button operating switch until the start winding is reconnected.

In summary, each of the embodiments provides complete protection against driving the operator beyond its limit switches by improper operation of the operating switches. The arrangement is quite simple, dependable and inexpensive and accomplishes the desired results without resort to timers, or complex electric or mechanical clutching arrangements.

I claim:
1. A control circuit for a reversible electric motor adapted to drive an operator between first and second limits of travel, said motor having a starting winding and a running winding, a motor operating circuit including motor winding switch contacts for connecting said starting and running windings to a power source, said motor winding switch contacts including reversing contacts for reversing the connections of the starting winding to the power source, a first centrifugal switch for disconnecting the starting winding from the power source whenever a predetermined motor speed is exceeded, said circuit comprising; first and second leads connectible across a power source, control relay means for connecting said motor winding switch contacts to drive said operator towards one or the other limit of travel, relay controlling switch means for said relay means, circuitry serially interconnecting said relay controlling switch means with said first lead and with said relay means and further connecting said relay means with said second lead, a pair of limit switches associated with each of said limits of travel for operating said relay means to stop said motor whenever a limit of travel is reached, and auxiliary centrifugal switch means in series connection with said relay means and said first lead, said auxiliary centrifugal switch means being connected to said motor and opened thereby whenever the first centrifugal switch is opened to prevent energization of said relay means by said switch means until the first centrifugal switch closes.

2. A control circuit according to claim 1, wherein said control relay means comprises first and second control relays, the first of said relays controlling said motor winding switch contacts to provide for operation of the motor in one direction and the second of said relays controlling the motor winding switch contacts to provide for operation of the motor in the opposite direction, said relay controlling switch means comprising first and second relay controlling switches, said first switch and said first relay being serially connected with one of said relays and with the second lead, said first relay controlling switch, said first relay and one of said limit switches being further connected in parallel relationship with the second relay operating switch, the second relay and the other of said limit switches, and further wherein said auxiliary centrifugal switch means is serially connected with each of said relays and the first lead, with the auxiliary centrifugal switch means being located between the relays and the first lead.

3. A circuit according to claim 2, wherein said auxiliary centrifugally operable switch means is a single switch.

4. A circuit according to claim 2, wherein each of said relay operating switches is manually operable.

5. A circuit according to claim 2, further including holding circuitry for each of said relays, the holding circuitry including a separate relay controlled holding switch for each of said relays, each switch being operable to be closed by energization of its associated relay, said holding circuitry providing a bypass through an energized holding switch around said relay controlling switches and said centrifugally operable switch to the first lead.

6. A circuit according to claim 4, further including a separate stop switch and circuitry controlled thereby for de-energizing an energized relay.

7. A circuit according to claim 6, wherein said stop switch is a normally closed switch serially connected with said holding circuitry and said first lead and operable when opened to break the circuit connection from the power source to an energized relay.

8. A circuit according to claim 5, wherein said holding circuitry comprises a double throw single pole switch for each of said relay, each said switch having a pole movable by its associated relay and providing a circuit path to a first contact when the relay is de-energized and to a second contact when the relay is energized, the poles of the two switches being electrically interconnected, a circuit bypassing the relay operating switches and the second centrifugal switch means connecting the first contacts to the first lead, the second contacts each being connected to their associated relay and further wherein said stop switch is a normally open switch, said stop switch operable when closed to provide a circuit path which electrically interconnects the second contacts.

9. A control circuit for a reversible electric motor adapted to drive an operator between first and second limits of travel, said motor having a starting winding and a running winding, a motor operating circuit including motor winding switch contacts for connecting said starting and running windings to a power source, a first centrifugal switch for disconnecting the starting winding from the power source whenever a predetermined motor speed is exceeded, said motor further being provided with a toggle mechanism controlling the motor winding switch contacts for reversing the connections of the starting winding to the power source whenever a limit of travel is reached, said circuit comprising; first and second leads connectible across a power source, control relay means comprising a latching relay operable to control connecting of the motor windings to the source of power, relay controlling switch means comprising a single operating switch, circuitry serially interconnecting said relay controlling switch means with said first lead and with said latching relay and further connecting said latching relay with said second lead, a pair of limit switches associated with each of said limits of travel for operating said latching relay to stop said motor whenever a limit of travel is reached, auxiliary centrifugal switch means in series connection with said latching relay, said relay controlling switch means and said first lead, said auxiliary centrifugal switch being serially connected between the latching relay and the relay operating switch, said latching relay having a set of contacts controlled thereby for serially connecting the latching relay with said first lead in a circuit in parallel with the relay operating switch, each of said limit switches comprising a normally closed set of contacts and a normally opened set of contacts, the normally closed contacts of the first limit switch being connected in series with the normally closed set of contacts of the second limit switch with the normally open set of contacts of the first limit switch being connected between the two sets of normally open contacts and the normally open set of contacts for the second limit switch being connected intermediate the normally closed contacts for both limit switches, a time delay relay and circuit connections providing for energization of said time delay relay upon depression of said relay operating switch, a normally closed switch in serial connection between said operating switch and said normally closed limit switch contacts and adapted to be opened by said time delay relay following energization of said latching relay, said auxiliary centrifugal switch means being connected to said motor and opened thereby whenever the first centrifugal switch is opened to prevent energization of said latching relay by said relay operating switch until the first centrifugal switch closes.

References Cited

UNITED STATES PATENTS

| | | | |
|---|---|---|---|
| 2,005,891 | 6/1935 | Elberty | 318—266 |
| 2,376,299 | 5/1945 | Wendelberg et al. | 318—284 |
| 2,661,450 | 12/1953 | Moler | 318—266 |

ORIS L. RADER, *Primary Examiner.*

K. L. CROSSON, H. W. COLLINS, *Assistant Examiners.*